United States Patent
Nakagawa et al.

(10) Patent No.: US 9,472,973 B2
(45) Date of Patent: Oct. 18, 2016

(54) NON-CONTACT CHARGING APPARATUS AND METHOD FOR CHARGING BATTERY

(71) Applicant: HONDA MOTOR CO., LTD., Tokyo (JP)

(72) Inventors: Tomoaki Nakagawa, Wako (JP); Yusaku Amari, Wako (JP); Atsushi Hirosawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 14/321,812

(22) Filed: Jul. 2, 2014

(65) Prior Publication Data

US 2015/0042271 A1 Feb. 12, 2015

(30) Foreign Application Priority Data

Aug. 12, 2013 (JP) ................. 2013-167407

(51) Int. Cl.
*H02J 7/00* (2006.01)
*H02J 7/02* (2016.01)
*H02J 5/00* (2016.01)
*H02J 17/00* (2006.01)

(52) U.S. Cl.
CPC ............ *H02J 7/025* (2013.01); *H02J 5/005* (2013.01); *H02J 7/0027* (2013.01); *H02J 17/00* (2013.01)

(58) Field of Classification Search
CPC .......................... H02J 7/025; H04B 5/0037
USPC ................................... 320/108, 109
See application file for complete search history.

(56) References Cited

U.S. PATENT DOCUMENTS

| | | | | |
|---|---|---|---|---|
| 4,852,695 A | * | 8/1989 | Ostrowiecki | B66B 1/20 187/380 |
| 5,019,990 A | * | 5/1991 | Kamimura | G01S 17/87 180/167 |
| 8,035,941 B2 | * | 10/2011 | Hasegawa | H05B 41/2855 324/239 |
| 2010/0201315 A1 | * | 8/2010 | Oshimi | H02J 7/025 320/108 |

FOREIGN PATENT DOCUMENTS

| | | |
|---|---|---|
| JP | 2008-295274 | 12/2008 |
| JP | 2009-089465 | 4/2009 |
| JP | 2010-119246 | 5/2010 |
| JP | 2013-150430 | 8/2013 |

OTHER PUBLICATIONS

Japanese Office Action for corresponding JP Application No. 2013-167407, Aug. 16, 2016 (w/ English machine translation).

* cited by examiner

*Primary Examiner* — M'Baye Diao
(74) *Attorney, Agent, or Firm* — Mori & Ward, LLP

(57) ABSTRACT

A non-contact charging apparatus includes a power-feeding coil, a power-receiving coil, a relative-position detector, and a feeding-power changing device. The power-receiving coil is configured to receive power from the power-feeding coil in a non-contact manner to charge a battery. The relative-position detector is configured to detect a distance between a center of the power-feeding coil and a center of the power-receiving coil. The feeding-power changing device is configured to decrease the power from the power-feeding coil to the power-receiving coil as the distance increases.

10 Claims, 13 Drawing Sheets

| POWER-FEEDING SIDE | POWER-RECEIVING SIDE |
|---|---|
| TYPE A | ALLOWABLE-POWER CHARACTERISTIC Pa |
| TYPE B | ALLOWABLE-POWER CHARACTERISTIC Pb |
| TYPE C | ALLOWABLE-POWER CHARACTERISTIC Pc |

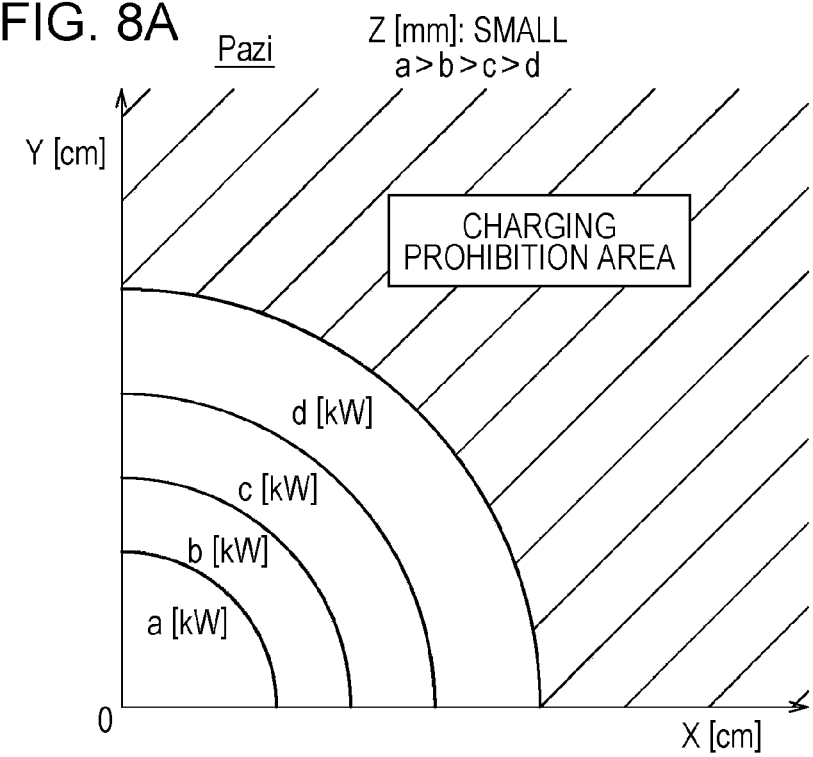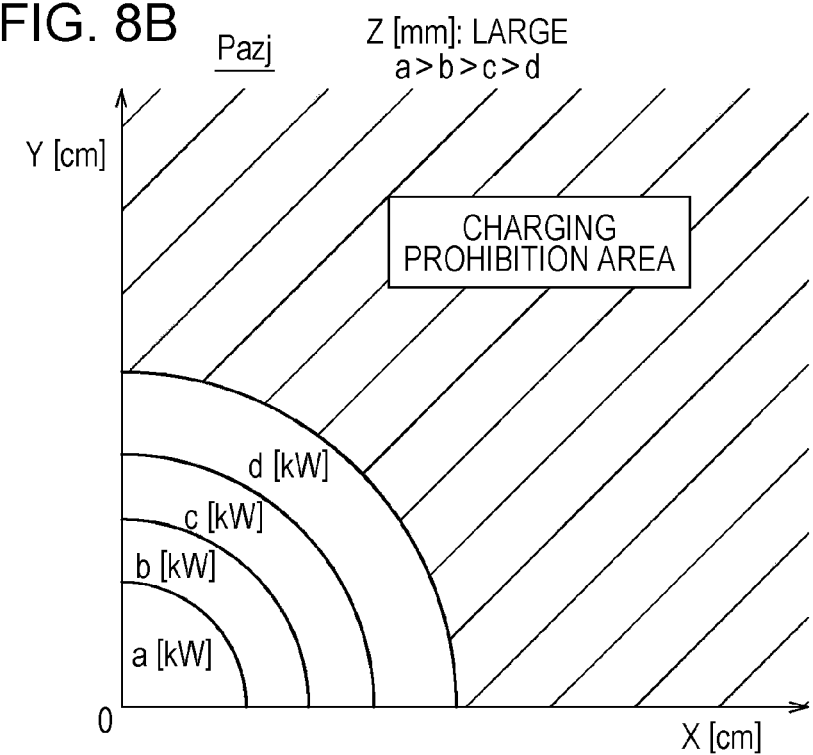

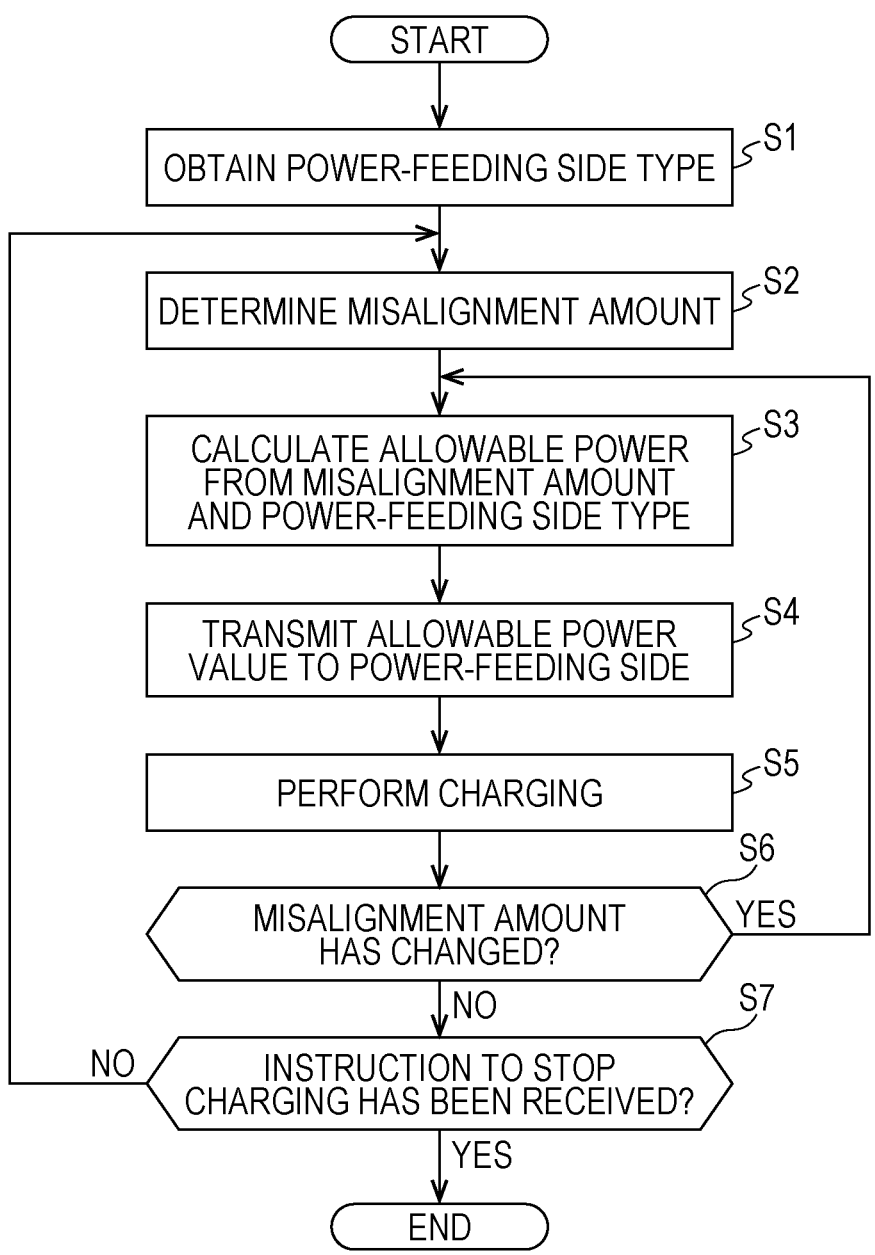

NON-CONTACT CHARGING APPARATUS AND METHOD FOR CHARGING BATTERY

CROSS-REFERENCE TO RELATED APPLICATIONS

The present application claims priority under 35 U.S.C. §119 to Japanese Patent Application No. 2013-167407, filed Aug. 12, 2013, entitled "Non-Contact Charging Apparatus." The contents of this application are incorporated herein by reference in their entirety.

BACKGROUND

1. Field

The present disclosure relates to a non-contact charging apparatus and a method for charging a battery.

2. Description of the Related Art

In Japanese Unexamined Patent Application Publication No. 2009-89465, a charging system having the following configuration is disclosed. When non-contact charging is to be performed, a leakage magnetic flux is detected from the relative positional relationship between a power-feeding coil and a power-receiving coil (in paragraph [0123]), and a user is notified through a misalignment display unit that an electronic device, e.g., a cooking device (in paragraph [0004]), having the power-receiving coil which is fixed is to be displaced to a position at which a leakage magnetic flux is large (in paragraph [0131]). As a result, charging of the electronic device at a position at which power transmission efficiency is high is achieved (in paragraph [0125]).

Thus, in non-contact charging, it is known that, when a power-feeding unit having a power-feeding coil and a power-receiving unit having a power-receiving coil are misaligned, a leakage magnetic flux is generated. As the misalignment amount increases and the power fed by the power-feeding unit increases, the leakage magnetic flux becomes larger.

Regarding a leakage magnetic flux or the like, the intensity of an electromagnetic field (the intensity of a leakage magnetic field and the intensity of a leakage electric field) which does not affect a human body is defined in the International Commission on Non-Ionizing Radiation Protection (ICNIRP) guideline.

SUMMARY

According to one aspect of the present invention, a non-contact charging apparatus includes a relative-position detection unit and a feeding-power changing unit. The non-contact charging apparatus receives power from a power-feeding coil through a power-receiving coil in a non-contact manner and charges a battery with the power. The relative-position detection unit detects a relative position between the center of the power-feeding coil and the center of the power-receiving coil. The feeding-power changing unit decreases feeding power from the power-feeding coil on the basis of the detected relative position, as a deviation amount of the relative position increases.

According to another aspect of the present invention, a non-contact charging apparatus includes a power-feeding coil, a power-receiving coil, a relative-position detector, and a feeding-power changing device. The power-receiving coil is configured to receive power from the power-feeding coil in a non-contact manner to charge a battery. The relative-position detector is configured to detect a distance between a center of the power-feeding coil and a center of the power-receiving coil. The feeding-power changing device is configured to decrease the power from the power-feeding coil to the power-receiving coil as the distance increases.

According to further aspect of the present invention, in a method for charging a battery, power is supplied from a power-feeding coil to a power-receiving coil in a non-contact manner to charge the battery. A distance between a center of the power-feeding coil and a center of the power-receiving coil is detected. The power from the power-feeding coil to the power-receiving coil is changed to decrease the power from the power-feeding coil to the power-receiving coil as the distance increases.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 8A is a diagram for describing characteristics of allowable power in the case where the distance in the vertical direction is relatively small.

FIG. 8B is a diagram for describing characteristics of allowable power in the case where the distance in the vertical direction is relatively large.

FIG. 9 is a flowchart for describing operations according to a first exemplary embodiment of the non-contact charging apparatus according to the embodiment.

DESCRIPTION OF THE EMBODIMENTS

Figure 1:
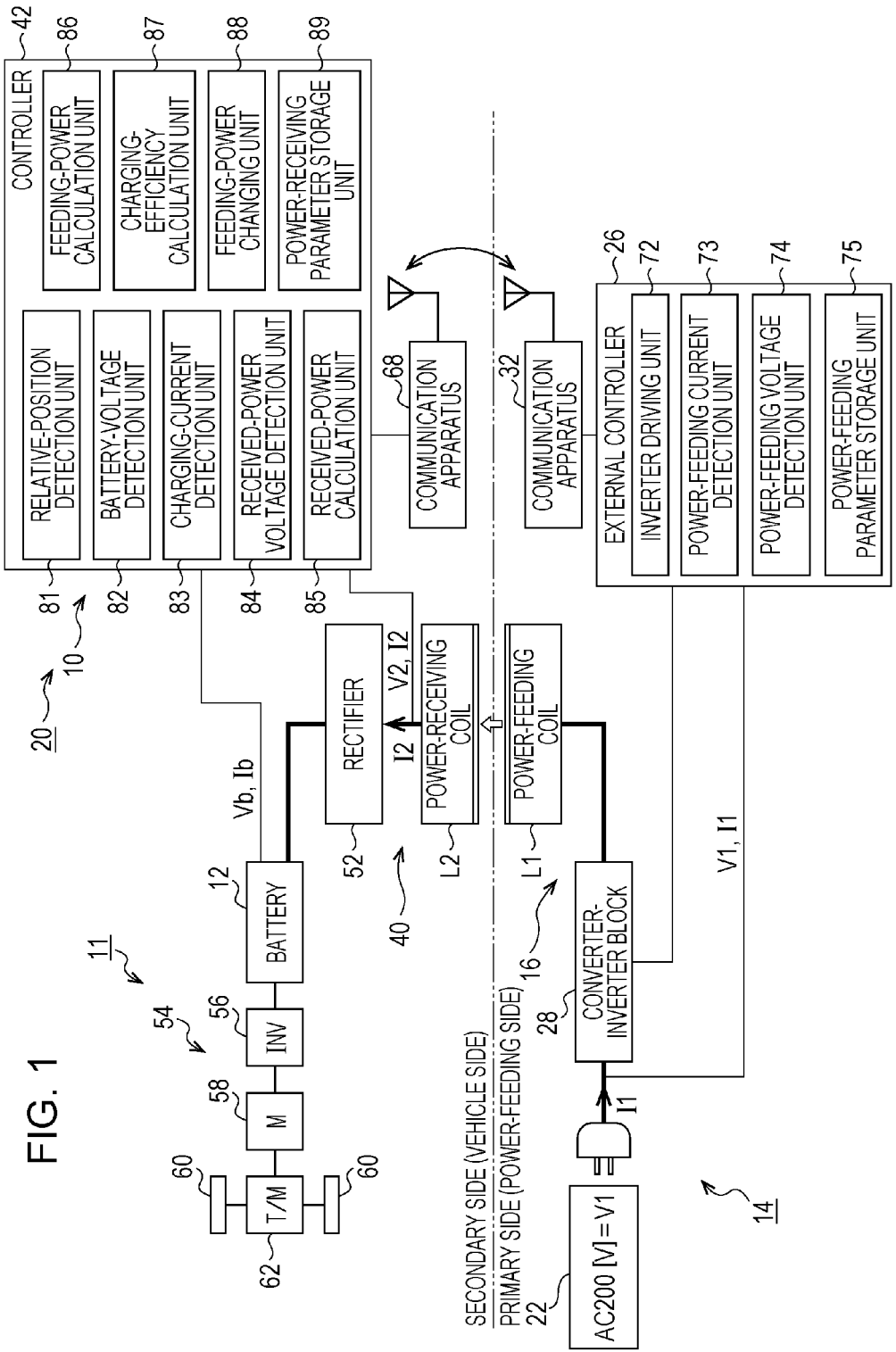
FIG. 1 is a schematic diagram illustrating the configuration of a non-contact charging system including an electrically driven vehicle in which a non-contact charging apparatus is mounted, and also including an external power-feeding apparatus, according to an embodiment.

The embodiments will now be described with reference to the accompanying drawings, wherein like reference numerals designate corresponding or identical elements throughout the various drawings.

A preferable embodiment of a non-contact charging apparatus will be described in detail below with reference to the attached drawings.

FIG. 1 is a schematic diagram illustrating the configuration of a non-contact charging system 20 which includes an electrically driven vehicle 11 including a non-contact charging apparatus 10 according to the present embodiment, and which also includes an external power-feeding apparatus 14 that charges a battery 12 such as a lithium ion battery mounted in the electrically driven vehicle 11, in a non-contact manner, according to the embodiment. In FIG. 1, components on the upper side of the long dashed double-short dashed line are included in the electrically driven vehicle 11 on the secondary side (vehicle side), and components on the lower side are included in the external power-feeding apparatus 14 on the primary side (power-feeding side).

Figures 2, 3:
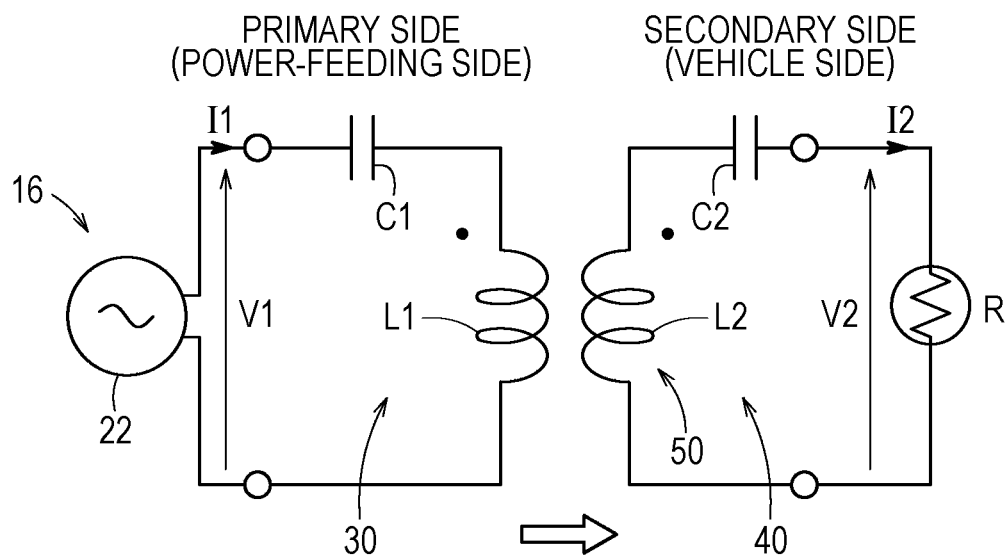
FIG. 2 is a simple equivalent circuit diagram for the non-contact charging system.
FIG. 3 is a diagram for describing a feeding-power variable characteristic stored in a feeding-power changing unit.

FIG. 2 is a simple equivalent circuit diagram for the non-contact charging system 20 illustrated in FIG. 1. In the present embodiment, description will be made by taking a magnetic resonance method as an exemplary non-contact power transmission method. However, the present disclosure may be applied to non-contact charging using electromagnetic induction as well as magnetic resonance.

In FIGS. 1 and 2, the external power-feeding apparatus 14 which is on the primary side (power-feeding side) basically includes a power-feeding circuit 16 and an external controller 26.

The power-feeding circuit 16 includes an alternating-current power supply apparatus 22 of alternating current (AC) 200 [V] (primary voltage V1=200 [V]), a converter-inverter block 28, and a feeding antenna (power-transmission antenna) 30 that is on the primary side (power-feeding side) and that includes a primary capacitor C1 and a power-feeding coil (primary coil) L1 which are used for resonance. The power-feeding coil L1 is buried underground or disposed, for example, so that the power-feeding coil L1 is approximately flush with the ground or that the height of the power-feeding coil L1 from the ground is equal to or smaller than a predetermined height.

In the case where the power-feeding coil L1 is approximately flush with the ground, a power-feeding position marker (charging position marker) corresponding to the outline of the power-feeding coil L1 is drawn at the position where the power-feeding coil L1 is buried underground. For example, in the case where the power-feeding coil L1 is a flat round coil, a round power-feeding position marker is drawn. In the case where the power-feeding coil L1 is a flat solenoid coil of square pillar shape, a rectangular power-feeding position marker is drawn.

The external controller 26 detects AC power of the alternating-current power supply apparatus 22 as feeding power P1 obtained by using the expression P1=V1×I1, where V1 is a primary voltage (power-feeding voltage) which is AC power and where I1 is a primary current (power-feeding current) which is AC current. The external controller 26 also exerts drive control (on/off control and duty variable control) on the converter-inverter block 28. The external controller 26 is connected to a communication apparatus 32.

The electrically driven vehicle 11 basically includes a power-receiving circuit 40 which is on the secondary side (the power-receiving side or the load side), a controller 42 which controls charging of the battery 12 with power from the power-feeding circuit 16, and a vehicle propelling unit 54, as well as the battery 12. The controller 42 may be divided into a battery controller which is a so-called battery electronic control unit (ECU), and a charging controller ECU which controls the entirety of the non-contact charging system 20.

The power-receiving circuit 40 includes a power receiving antenna (a power-receiving side antenna or a receiving antenna) 50 (see FIG. 2) including a secondary capacitor C2 and a power-receiving coil (secondary coil) L2 which are used for resonance, and a rectifier 52 (see FIG. 1) which rectifies received power (load power) P2 which is AC power received by the power-receiving coil L2. The received power P2 supplied to a load R is represented as the product of a received-power voltage (secondary voltage) V2 which is an output voltage of the power-receiving circuit 40 and a charging current I2 that is the secondary current and that is an output current of the power-receiving circuit 40 (P2=V2× I2), and is detected by the controller 42. The power-receiving coil L2 is disposed, for example, at the bottom under the trunk of the electrically driven vehicle 11.

The battery 12 is connected to the vehicle propelling unit 54 which is controlled by a vehicle-propelling controller (not illustrated). The vehicle propelling unit 54 includes an inverter 56 which converts the voltage (battery voltage) Vb of the battery 12 into an alternating current, a motor generator 58 which is used to propel the vehicle and which is driven by the inverter 56, and a transmission 62 which transmits the torque of the motor generator 58 to driving wheels 60. The present disclosure focuses on non-contact power transmission which is received from the power-feeding circuit 16 that is present in the outside and which is performed when the electrically driven vehicle 11 stops or is parked. Therefore, the detailed configuration and operations of the vehicle propelling unit 54 will not be described.

As The electrically driven vehicle 11, this disclosure focuses on a vehicle which may be charged with external power and which is, for example, any of a hybrid vehicle having an engine, a range extender vehicle, or a fuel cell vehicle having a fuel cell, as well as an electric car which is a so-called EV and which runs only with the battery 12.

The non-contact charging apparatus 10 includes the controller 42. The controller 42 is connected to the battery 12 and the power receiving antenna 50 (power-receiving coil L2), and is also connected to a communication apparatus 68 which performs wireless communication with the communication apparatus 32 of the external controller 26.

Each of the controller 42 and the external controller 26 is constituted by an ECU. The ECU is a computer including a microcomputer, and includes a central processing unit (CPU), a read-only memory (ROM) which is a memory and which may be an electrically erasable programmable ROM (EEPROM), a random access memory (RAM), an input/output device, such as an analog/digital (A/D) converter or a digital/analog (D/A) converter, and a timer which serves as a timer unit. The CPU reads out programs stored in the ROM and executes them, whereby the ECU serves as various function-achieving units, such as a controller, an arithmetic logical unit, and a processor.

In the present embodiment, the external controller 26 included in the external power-feeding apparatus 14 serves as, for example, an inverter driving unit 72 which exerts pulse width modulation (PWM) drive control, which is duty control, on the converter-inverter block 28, a power-feeding current detection unit 73 which detects the primary current I1, and a power-feeding voltage detection unit 74 which detects the primary voltage V1. The external controller 26 includes a power-feeding parameter storage unit 75 which stores characteristics of the power-feeding coil L1 and the type (type A, B, C, or the like described below) corresponding to the specification of the external power-feeding apparatus 14.

The controller 42 included in the non-contact charging apparatus 10 serves as, for example, a relative-position detection unit 81 which detects a relative position (a distance R and a misalignment amount Rs whose definitions are described below) between the center of the power-feeding coil L1 and that of the power-receiving coil L2, a battery-voltage detection unit 82 which detects the voltage (battery voltage) Vb of the battery 12, a charging-current detection unit 83 which detects the charging current (the received-power current or the charging current) I2 flowing into the rectifier 52, a received-power voltage detection unit 84 which detects the secondary voltage which is the voltage of the power-receiving circuit 40, as the received-power voltage (load voltage) V2, a received-power calculation unit 85 which calculates the received power P2 (P2=I2×V2) from the charging current I2 and the received-power voltage V2 which are detected, a feeding-power calculation unit 86, a charging-efficiency calculation unit 87, a feeding-power changing unit 88, and a power-receiving parameter storage unit 89 which stores the type corresponding to the specification of the power-receiving circuit 40, or characteristics of the power-receiving coil L2, such as the number of turns and the shape.

The feeding-power changing unit 88 stores a feeding-power variable characteristic 100 illustrated in FIG. 3. The feeding-power variable characteristic 100 is changed by selecting a corresponding map (corresponding table) for allowable-feeding-power characteristics (allowable-power characteristics) Pa, Pb, and Pc which corresponds to the type of the external power-feeding apparatus 14 (power-feeding side), e.g., the type A, B, or C, and which is used to set (calculate) allowable feeding power Pp corresponding to the misalignment amount Rs. The allowable-feeding-power characteristic (allowable-power characteristic) Pa will be described below as an example.

The allowable-power characteristic Pa, Pb, or Pc may be determined by comparing the characteristics of the power-feeding coil L1, i.e., power feeding parameters, such as the coil shape (round or square), the inductance of the coil, the resonant frequency, the number of turns, and the coil diameter, with those of the power-receiving coil L2, i.e., power-receiving parameters.

Figure 4:
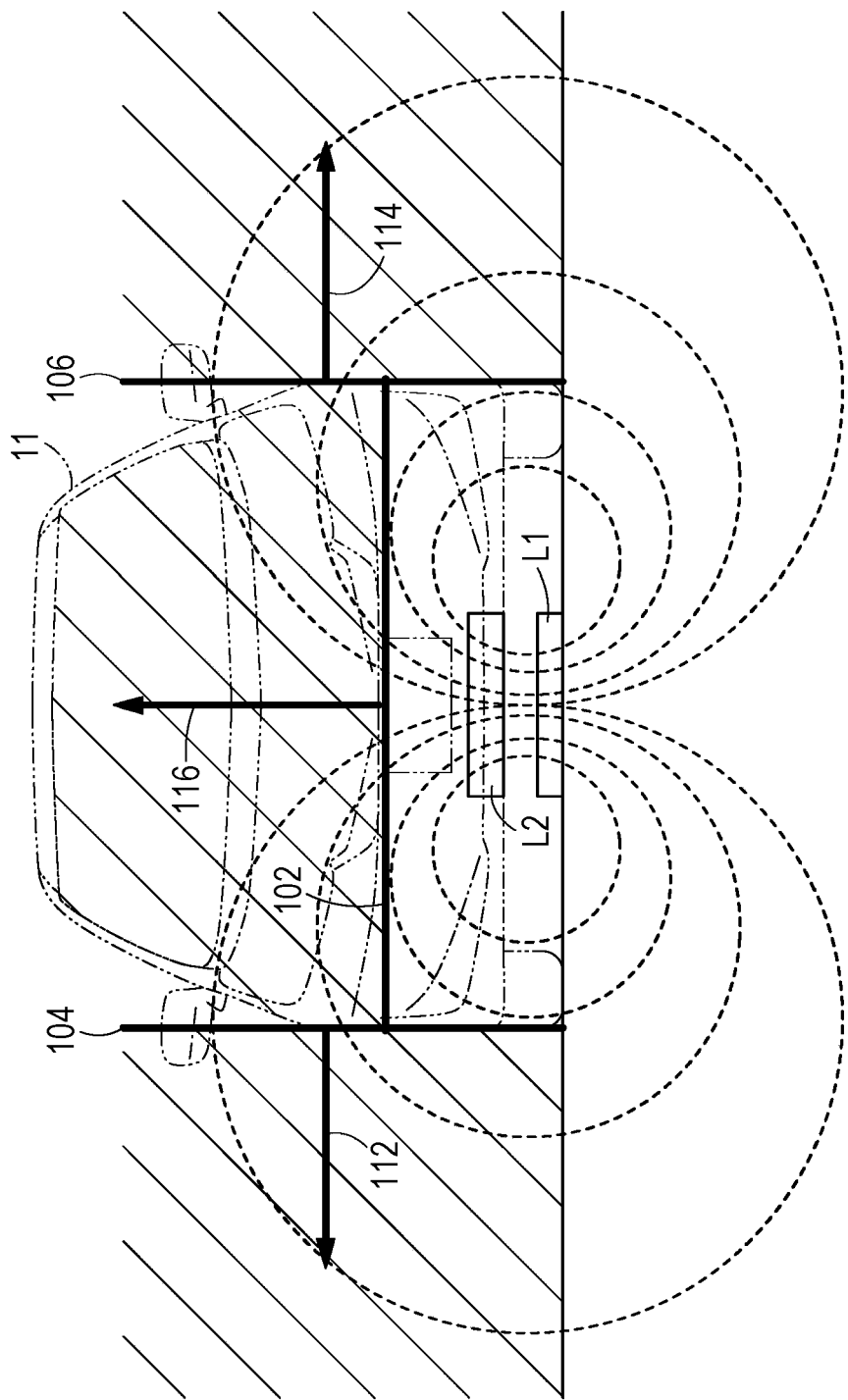
FIG. 4 is a front view for describing the non-contact charging system.
Figure 5:
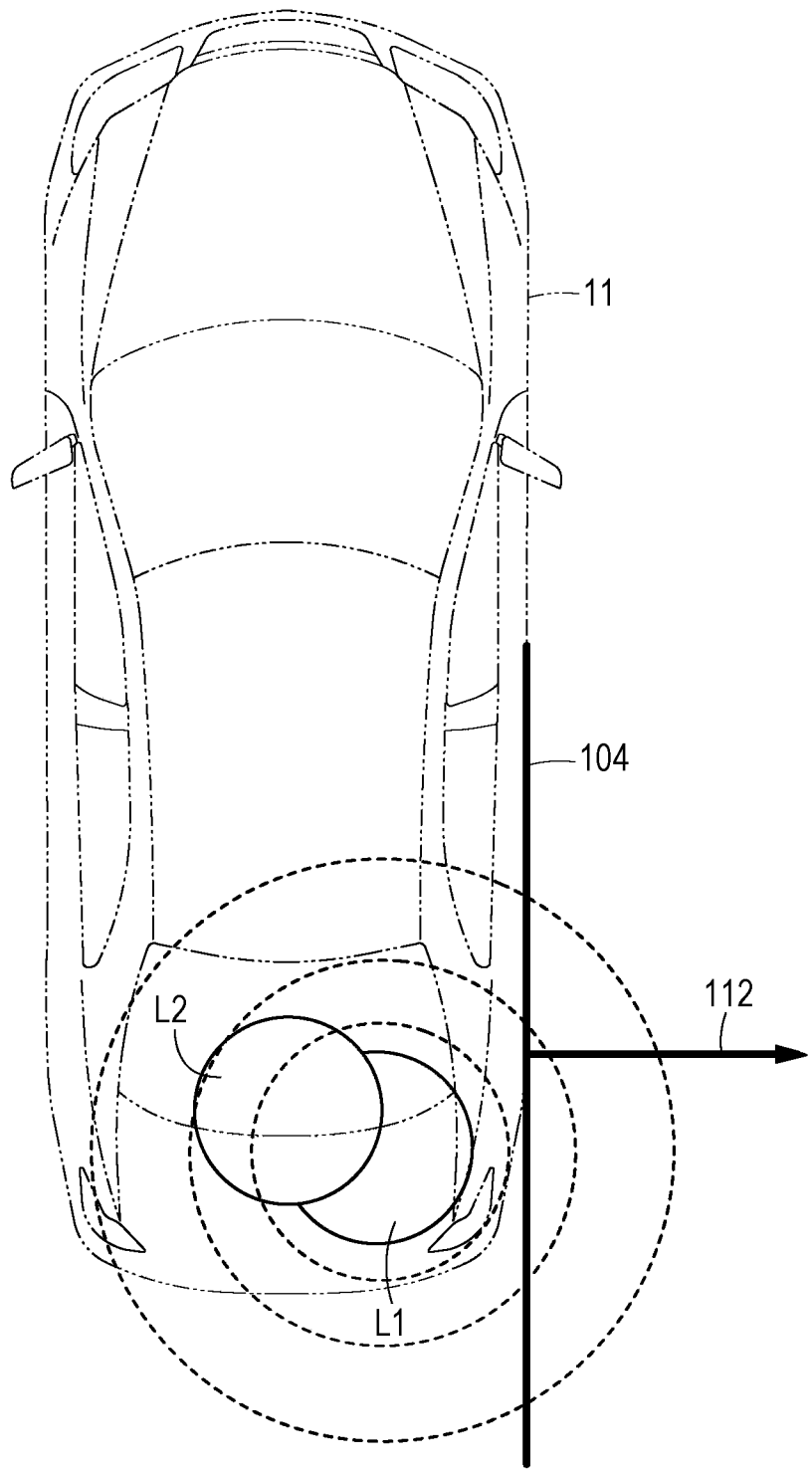
FIG. 5 is a plan view for describing the non-contact charging system.

As illustrated in the front view in FIG. 4 and in the plan view in FIG. 5 as an example, the allowable feeding power Pp is determined so that, in the present embodiment, the amount of the leakage electromagnetic field from the power-feeding coil L1 illustrated as a round coil is, for example, within the regulation value in the ICNIRP guideline, in the area in which a human body which is present in the cabin above a floor 102 of the electrically driven vehicle 11 (see FIG. 4) or in vehicle outside spaces in the outer areas of left and right sides 104 and 106 of the electrically driven vehicle 11 (see FIGS. 4 and 5) may be exposed to a leakage electromagnetic field, and in a predetermined area expanding in the horizontal directions 112 and 114 (in FIG. 5, the reference number is not illustrated) and in the vertical direction 116 (see FIG. 4).

Figure 6A:
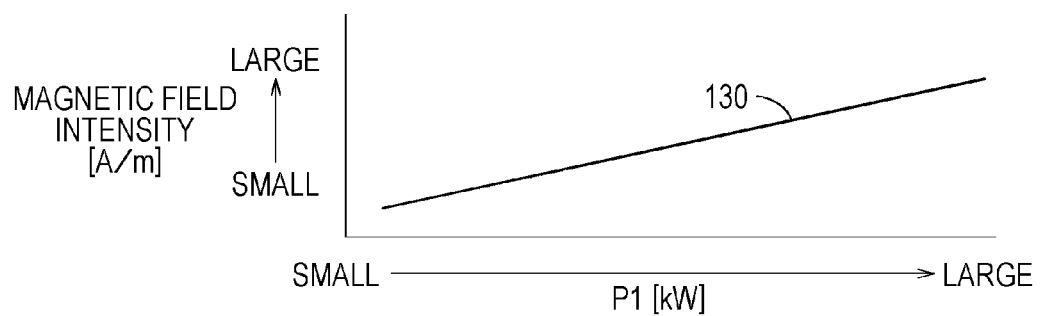
FIG. 6A is a diagram illustrating the variation character of the intensity of a leakage magnetic field with respect to feeding power.
Figure 6B:
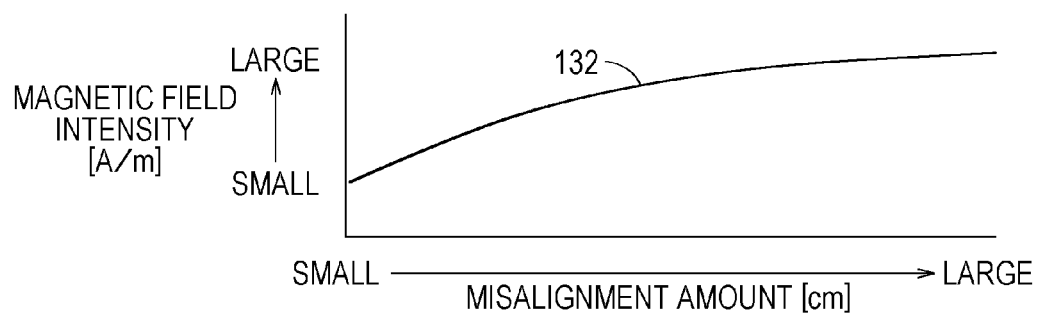
FIG. 6B is a diagram illustrating the variation character of the intensity of a leakage magnetic field with respect to a misalignment amount.

In FIGS. 4 and 5, the leakage electromagnetic field is represented by circles drawn by using dashed lines. For example, as illustrated in a characteristic 130 in FIG. 6A, as the feeding power P1 increases, the leakage magnetic field intensity [A/m] with respect to the feeding power P1 linearly increases. As illustrated in a characteristic 132 in FIG. 6B, the leakage magnetic field intensity [A/m] with respect to the misalignment amount Rs rapidly increases in a range in which the misalignment amount Rs is small, and the intensity increases in a range in which the misalignment amount Rs is large, in such a manner that the increasing rate gradually decreases. In the example in FIGS. 6A and 6B, the misalignment amount Rs produced when the center of the power-feeding coil L1 matches that of the power-receiving coil L2 (the center axes matches each other), i.e., when the intensity of the leakage electromagnetic field is the smallest, is set to zero.

For a round coil, the center axis means an axis which goes through the center of a circle constituting a round loop and which goes in the vertical direction coinciding with the magnetic path direction. For a square coil, the center axis means an axis which goes through the center of rectangular parallelepiped and which is parallel to the magnetic path direction. The coincidence of the center axes indicates that the center axes match each other for a round coil, and means that the center axes match each other in plan view for a square coil.

It is not necessary to determine both of the allowable feeding power Pp for an electric field and that for a magnetic field. The allowable feeding power Pp may be determined by using a more rigid value for the misalignment amount Rs.

Figure 7A:
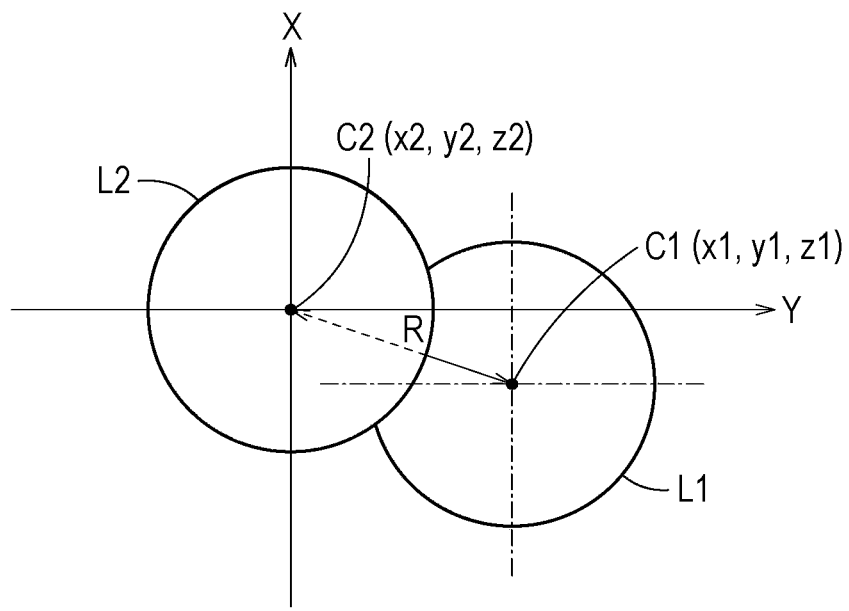
FIG. 7A is a plan view for describing the three-dimensional distance between the center of a power-feeding coil and that of a power-receiving coil.
Figure 7B:
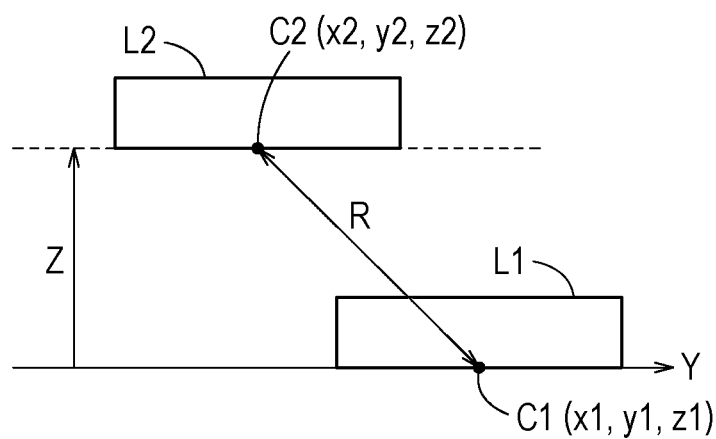
FIG. 7B a side view for describing the three-dimensional distance between the center of the power-feeding coil and that of the power-receiving coil.

As illustrated in the plan view in FIG. 7A and the side view in FIG. 7B, the allowable-power characteristics Pa, Pb, and Pc are set depending on the relative distance R(X, Y, Z) $(R=(X^2+Y^2+Z^2)^{1/2})$ representing the distance between the coordinates C1(x1, y1, z1) of the center position C1 of the power-feeding coil L1 and the coordinates C2(x2, y2, z2) of the center position C2 of the power-receiving coil L2, where $X=x2-x1$, $Y=y2-y1$, and $Z=z2-z1$. The relative distance R(X, Y, Z) is equal to the distance (three-dimensional distance) between the center position C1 of the power-feeding coil L1 and the center position C2 of the power-receiving coil L2.

For example, as illustrated in FIGS. 8A and 8B, the allowable-power characteristic Pa in FIG. 3 has a characteristic in which the feeding power P1 (a [kW], b [kW], c [kW], and d [kW] where a>b>c>d) in an allowable-power characteristic Pazj is smaller than that in an allowable-power characteristic Pazi. The allowable-power characteristic Pazi is set for a case in which the relative distances X and Y in the planar direction (X and Y directions) are not changed and in which the relative distance Z [mm] in the vertical direction (height direction) which is changed, for example, due to loading/unloading of loads or passengers is small. The allowable-power characteristic Pazj is set for a case in which the relative distance Z [mm] in the height direction is large. Even in the case where the received power P2 has the same value, when the relative distance Z [mm] is large, the leakage electromagnetic field intensity is large. Therefore, the characteristic is set so that the feeding power P1 in such a case is reduced. Note that each of the values of the allowable power (feeding power) a [kW], b [kW], c [kW], and d [kW] in FIG. 8B is smaller than a corresponding one of the values of the allowable power (feeding power) a [kW], b [kW], c [kW], and d [kW] in FIG. 8A.

In the area in which the relative distance R is equal to or larger than a threshold distance, the charging efficiency η decreases, and the leakage electromagnetic field intensity is large. Therefore, as illustrated by using a hatch pattern, the area is set as a "charging prohibition area".

The description will be repeatedly made. Note that the values of the allowable power (feeding power) a [kW], b [kW], c [kW], and d [kW] have the relation a>b>c>d in FIGS. 8A and 8B. This is because, when the relative distance R is smaller (when the relative distance R is the smallest, the center axis of the power-feeding coil L1 matches that of the power-receiving coil L2, and this state corresponds to the origin 0 in FIGS. 8A and 8B), non-contact transmission with large feeding power P1 does not increase the leakage electromagnetic field intensity.

The feeding-power changing unit 88 searches the feeding-power variable characteristic 100 on the basis of the relative distance R to select one from the allowable-power characteristics Pa, Pb, and Pc which corresponds to the power-feeding side, and transmits an instruction to the external controller 26 on the primary side.

Regarding the relative distance R (see FIGS. 7A and 7B), a relative-distance measuring apparatus, such as a radar rangefinder, an image capture apparatus (a camera or a stereo camera), a sonar, or a global positioning system (GPS) device, may be used to measure an actual distance. In this case, a marker is drawn at the position where the power-feeding coil L1 is buried. At the center of the marker which is the center (center position) C1 of the power-feeding coil L1, a target such as a transmitter which is necessary for the relative-distance measuring apparatus is disposed. Appropriate relative-distance measuring apparatuses are set in the electrically driven vehicle 11 and the external power-feeding apparatus 14.

Figure 10:
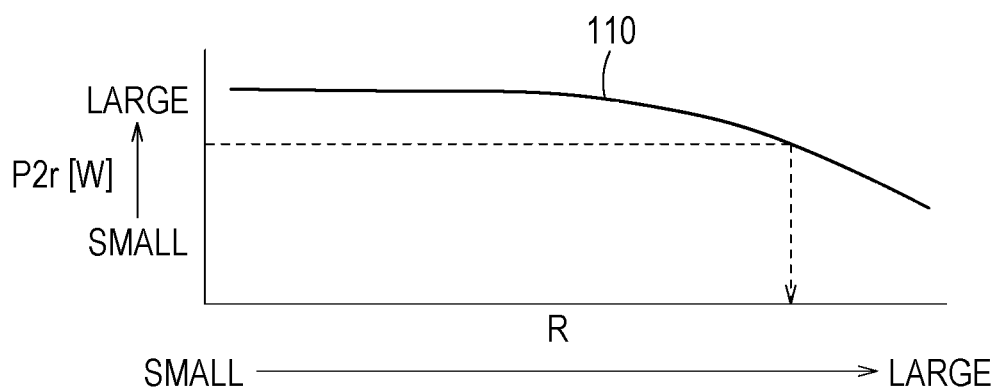
FIG. 10 is a diagram for describing the relationship between a relative distance and received power which is generated when a known power-feeding coil produces predetermined weak power.

In the present embodiment, a relative-distance measuring apparatus (relative-distance measuring unit) which indirectly measures the relative distance R before start of charging is included. As illustrated in FIG. 10, the relative-distance measuring apparatus is used to store the correspondences between the relative distance R and the power P2r as a characteristic 110 used to detect the relative distance R, in the feeding-power changing unit 88. The power P2r is received by the power-receiving coil L2 on the secondary side by feeding predetermined weak power which does not affect a human body and which corresponds to the type A, B, or C (see FIG. 3) of the power-feeding side, from the power-feeding coil L1.

For the sake of easy understanding, a relative-distance measuring apparatus which measures the actual distance as it is, as the relative distance R, and a relative-distance measuring apparatus which indirectly measures the relative distance R are regarded as the relative-position detection unit (misalignment-amount detection unit) 81, and will be described as a function of the controller 42.

Basically, operations performed by the non-contact charging system 20 including the non-contact charging apparatus 10 having the above-described configuration will be described with reference to the flowcharts in FIG. 9 (first exemplary embodiment), FIG. 12 (second exemplary embodiment), FIG. 13 (third exemplary embodiment), and FIG. 14 (fourth exemplary embodiment). In the flowcharts in FIGS. 9, 12, 13, and 14, a process represented by the same step number is the identical process or a corresponding process, and will not be repeatedly described in the exemplary embodiments.

In the first to fourth exemplary embodiments described below, the electrically driven vehicle 11 stops or is parked, and the engine and/or the driving source such as the motor generator 58 are not in operation.

First Exemplary Embodiment

Process Performed when Position Detection Responsivity and Feeding-Power Variable Responsivity of Non-Contact Charging System 20 are High In the first exemplary embodiment for which the flowchart in FIG. 9 is referred to, when the relative distance (misalignment amount) R changes, allowable power for the power-feeding coil L1 which corresponds to the amount of the change is calculated. The calculated allowable power is set, and the charging is continued.

In step S1 in FIG. 9, the controller 42 (the feeding-power changing unit 88 of the controller 42) communicates with the external controller 26 of the external power-feeding apparatus 14 via the communication apparatuses 32 and 68, and reads out and obtains the type representing the specification of the external power-feeding apparatus 14 (assume that the type A is obtained) from the power-feeding parameter storage unit 75.

In step S2, to determine the relative distance (misalignment amount) R, the relative-position detection unit 81 exerts drive control on the converter-inverter block 28 through the communication apparatuses 68 and 32 and the external controller 26 so that predetermined weak power corresponding to the type A is generated.

At that time, the received-power calculation unit 85 calculates the received power P2 (=V2×I2) from the received-power voltage V2 detected by the received-power voltage detection unit 84 and the charging current (received-power current) I2 detected by the charging-current detection unit 83. The received power P2 is used as the power P2r illustrated in FIG. 10 to obtain (determine) the relative distance (misalignment amount) R from the characteristic 110.

In step S3, the feeding-power changing unit 88 refers to the allowable-power characteristics Pazi and Pazj illustrated in FIGS. 3, 8A, and 8B on the basis of the relative distance (misalignment amount) R and the power-feeding side type A so as to calculate the allowable power, i.e., the allowable feeding power (assume that b [kW] illustrated in FIG. 8A is calculated), and transmits an instruction to the external controller 26 via the communication apparatuses 68 and 32.

In this case, the external controller 26 exerts PWM drive control on the inverter included in the converter-inverter block 28 through the inverter driving unit 72 so that the feeding power P1 is equal to b [kW] (see FIG. 8A).

Thus, in step S5, charging is started (when charging has been already started, the charging is continued). By starting the charging in this manner, the leakage electromagnetic field intensity may be suppressed so as to be within the allowable range.

In step S6, the relative-position detection unit 81 determines the relative distance (misalignment amount) R by using the relative-distance measuring apparatus which measures the actual distance as it is, as the relative distance R, thereby determining whether or not the relative distance (misalignment amount) R has changed.

If the relative distance (misalignment amount) R has not changed (NO in step S6), whether or not an instruction to stop the charging (instruction transmitted due to a full charge or by a user) has been received is determined in step S7. If the instruction to stop the charging has not been received (NO in step S7), the process of determining the relative distance (misalignment amount) in step S2 and its subsequent processes are performed. In the process of determining the relative distance (misalignment amount) in step S2 in the case where the charging is continued, similarly to the case in step S6, the relative-distance measuring apparatus which measures the actual distance as it is, as the relative distance R is used to determine the relative distance (misalignment amount) R.

In the determination in step S6, if the relative distance (misalignment amount) R has changed (YES in step S6), even when the external positions are identical, the allowable power from the power-feeding coil L1 is calculated again in step S3 in order to avoid a possible situation in which the leakage electromagnetic field intensity has increased. A change in the relative distance (misalignment amount) R may be generated, for example, due to loading/unloading of loads into/from the trunk, as described above. The change may be also generated due to loading/unloading of passengers.

Figure 11:
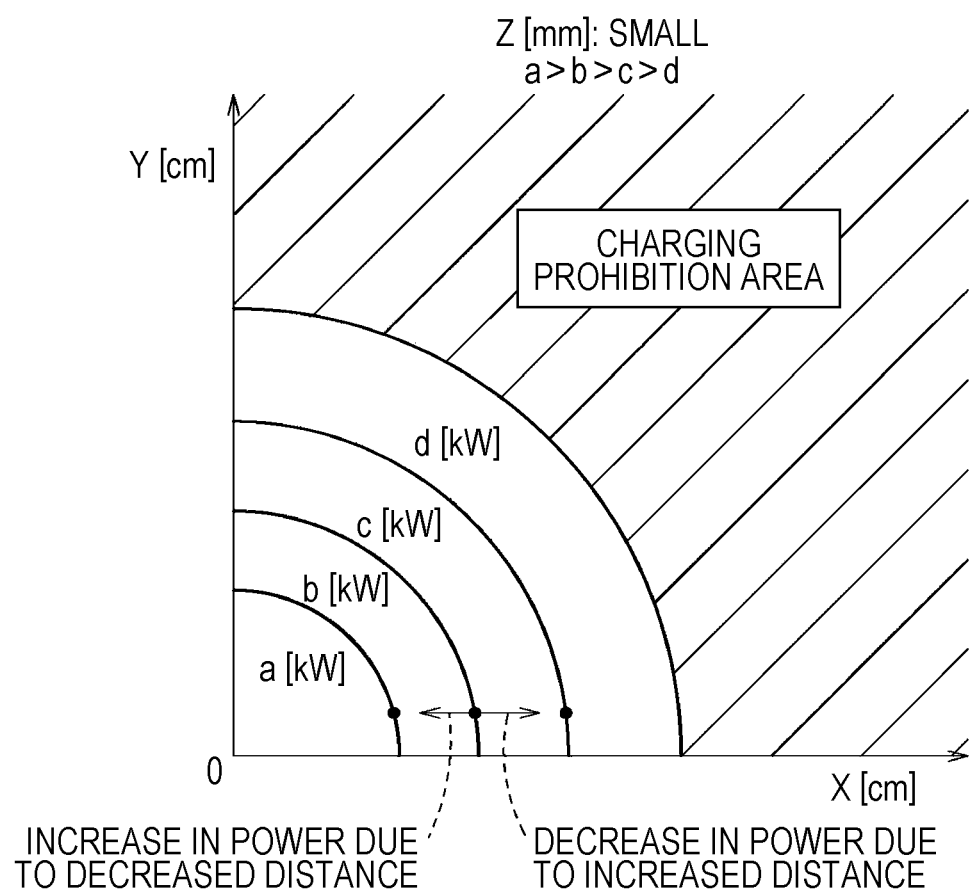
FIG. 11 is a diagram for describing a change in allowable power which is made in the case where misalignment occurs after start of charging and where charging is to be continued in an allowable range of the intensity of a leakage electromagnetic field.

In this case, the feeding-power changing unit 88 exerts drive control on the converter-inverter block 28 (PWM control for changing the on-duty value) through the communication apparatuses 68 and 32 and the inverter driving unit 72 on the basis of the recalculated allowable power. For example, as illustrated in FIG. 11, in the case where the charging has been started at the allowable power b[kW], when the relative distance (misalignment amount) R increases, the on-duty value is decreased to reduce the allowable power to the c [kW] side. When the relative distance (misalignment amount) R decreases, the on-duty value is increased to increase the allowable power to the a [kW] side.

Therefore, even in the case where the relative distance (misalignment amount) R has changed after start of charging ("after" indicates a time period which includes a period during charging and which ends when the charging is stopped), when the position detection responsivity and the feeding-power variable responsivity of the non-contact charging system 20 are high, the charging may be continued in step S7 in such a manner that the leakage electromagnetic field intensity does not affect the outside (e.g., the amount defined in the ICNIRP guideline), until an instruction to stop the charging is transmitted.

The electrically driven vehicle 11 including the non-contact charging apparatus 10 according to the first exemplary embodiment includes the relative-position detection unit (misalignment-amount detection unit) 81 which detects the relative position between the center C1 of the power-feeding coil L1 and the center C2 of the power-receiving coil L2, as the relative distance R, in the case where the feeding power P1 is received from the power-feeding coil L1 through the power-receiving coil L2 in a non-contact manner and where the battery 12 is charged with the power. The electrically driven vehicle 11 also includes the feeding-power changing unit 88 which decreases the feeding power P1 from the power-feeding coil L1 on the basis of the detected relative distance (misalignment amount) R as the deviation amount of the relative distance R (misalignment amount Rs) increases.

According to the first exemplary embodiment, when the relative distance (misalignment amount) R determined by the relative-position detection unit 81 changes, the feeding-power changing unit 88 calculates (obtains) the allowable power corresponding to the changed relative distance (misalignment amount) R, and controls the converter-inverter block 28 of the power-feeding circuit 16, thereby changing the feeding power P1 from the power-feeding coil L1. Therefore, the feeding-power changing unit 88 exerts drive control so that the charging is continued with the calculated (obtained) allowable power.

The relative distance (misalignment amount) R between the power-feeding coil L1 and the power-receiving coil L2 is determined. As the determined deviation amount (misalignment amount Rs) increases, the feeding power P1 from the power-feeding coil L1 is decreased, enabling the charging to be continued in such a manner that the leakage electromagnetic field intensity does not affect the outside.

In this case, the charging is performed with the feeding power P1 determined on the basis of the relative distance (misalignment amount) R determined in step S2 of the first loop after the relative-position detection unit 81 detects the relative position (acquisition of the power-feeding side type in step S1) before start of the charging. In addition, the feeding-power changing unit 88 further changes the feeding power P1 on the basis of the relative distance (misalignment amount) R determined in step S6 at every determined time after start of the charging. Therefore, after the charging is started, even when the relative distance (misalignment amount) R changes, for example, due to loading/unloading of loads, the charging can be continued in such a manner that the leakage electromagnetic field intensity does not affect the outside.

Second Exemplary Embodiment

Figure 12:
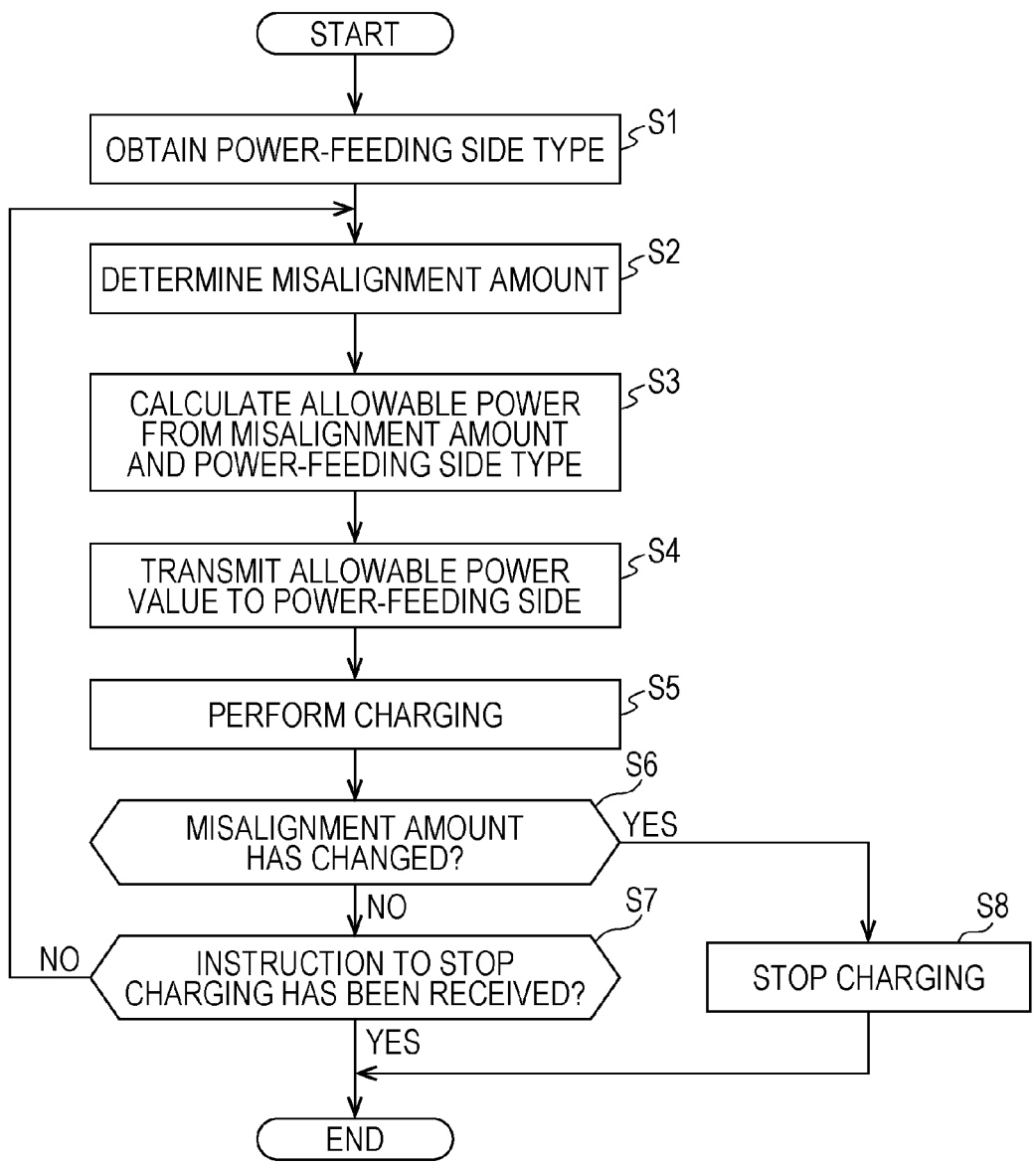
FIG. 12 is a flowchart for describing operations according to a second exemplary embodiment of the non-contact charging apparatus according to the embodiment.

Process Performed when Position Detection Responsivity and Feeding-Power Variable Responsivity of Non-Contact Charging System 20 are Low In a second exemplary embodiment for which the flowchart in FIG. 12 is referred to, after charging is started, that is, in a process in which the relative distance (misalignment amount) is determined and which is performed in step S6 after the process has performed steps S1 to S6 (NO), step S7 (NO), and step S2 and its subsequent steps, in the case where a change in the relative distance (misalignment amount) R is detected (YES in step S6), in step S8, the charging is immediately stopped because the determination has been made on the basis of the type A or the like (the position detection responsivity and the feeding-power variable responsivity of the non-contact charging system 20 are low). Thus, a state in which the leakage electromagnetic field intensity exceeds that which does not affect the outside (e.g., the intensity defined in the ICNIRP guideline) even for a momentary time period due to low position detection responsivity and low feeding-power variable responsivity of the non-contact charging system 20 can be avoided.

In step S8, when the charging is stopped, it is preferable to notify a user such as a driver by using the speaker or a display in a car, and/or by notifying the external power-feeding apparatus 14 via the communication apparatuses 68 and 32.

Third Exemplary Embodiment

Figure 13:
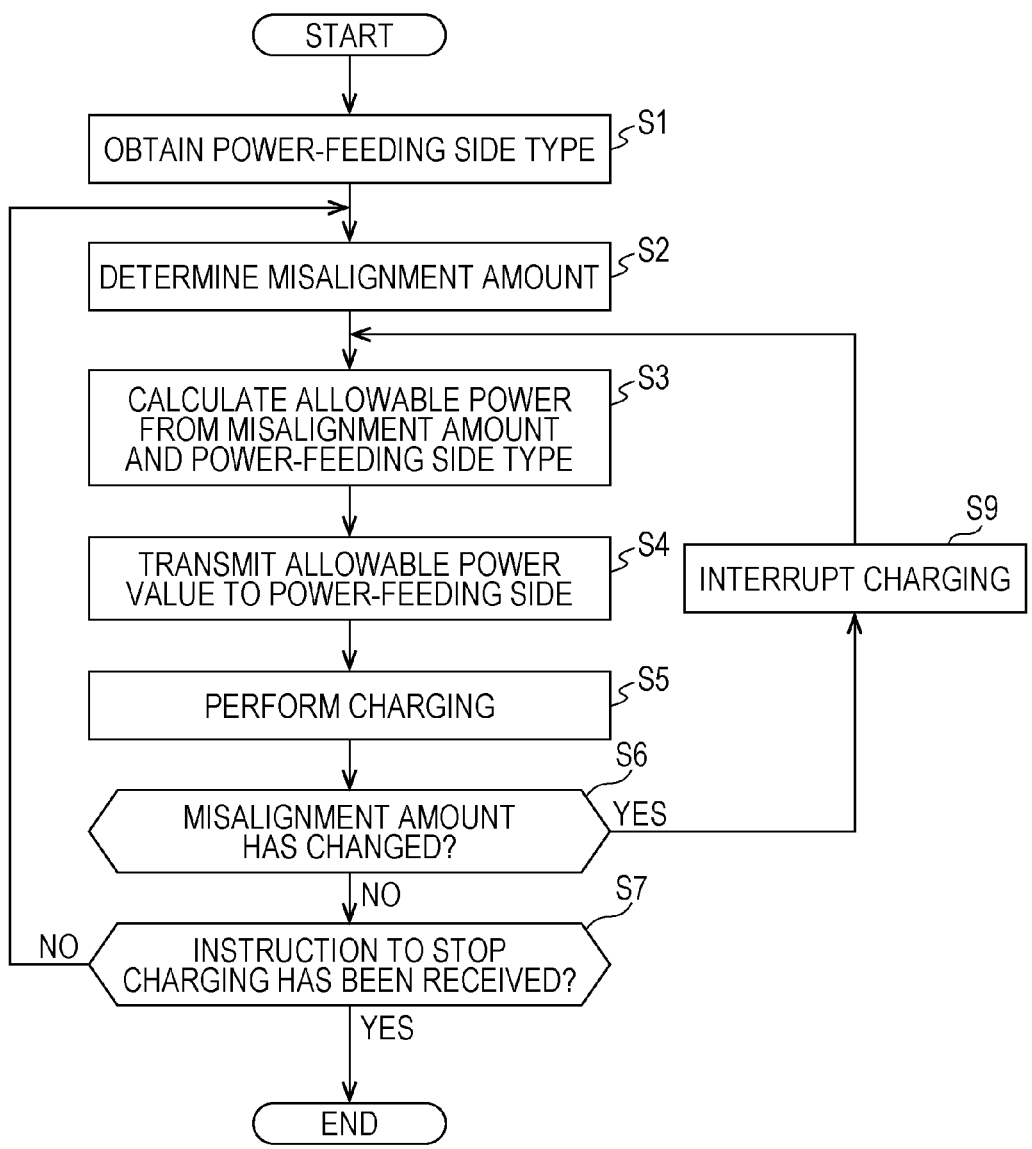
FIG. 13 is a flowchart for describing operations according to a third exemplary embodiment of the non-contact charging apparatus according to the embodiment.

Process of Stopping and then Restarting Charging Every Time Relative Distance (Misalignment Amount) R is Changed In a third exemplary embodiment for which the flowchart in FIG. 13 is referred to, after charging is started, that is, in a process in which the relative distance (misalignment amount) is determined and which is performed in step S6 after the process has performed steps S1 to S6 (NO), step S7 (NO), and step S2 and its subsequent steps, in the case where a change in the relative distance (misalignment amount) R is detected (YES in step S6), that is, in the case where the relative distance (misalignment amount) R has changed between the previous determination and the determination performed this time in the process in step S6 which is performed at every predetermined time, the charging is immediately interrupted in step S9. Thus, similarly to the second exemplary embodiment, a state in which the leakage electromagnetic field intensity exceeds that which does not affect the outside (e.g., the intensity defined in the ICNIRP guideline) even for a momentary time period due to low position detection responsivity and low feeding-power variable responsivity of the non-contact charging system 20 can be avoided.

After a predetermined time determined, for example, on the basis of the type of the external power-feeding apparatus 14 and the non-contact charging apparatus 10 has elapsed, allowable power is calculated again in step S3 from the relative distance (misalignment amount) R determined in step S6 and from the power-feeding side type, and charging is restarted in steps S4 and S5.

According to the third exemplary embodiment, when the relative position changes after start of charging, the feeding-power changing unit 88 interrupts the feeding of power regardless of the relative distance (misalignment amount) R, whereby charging may be restarted in such a manner that the leakage electromagnetic field intensity does not affect the outside, with further certainty.

That is, after the feeding of power is interrupted, the feeding-power changing unit 88 may restart power supply on the basis of the relative position, i.e., the relative distance (misalignment amount) R, detected by the relative-position detection unit 81, and may continue charging.

Fourth Exemplary Embodiment

Figure 14:
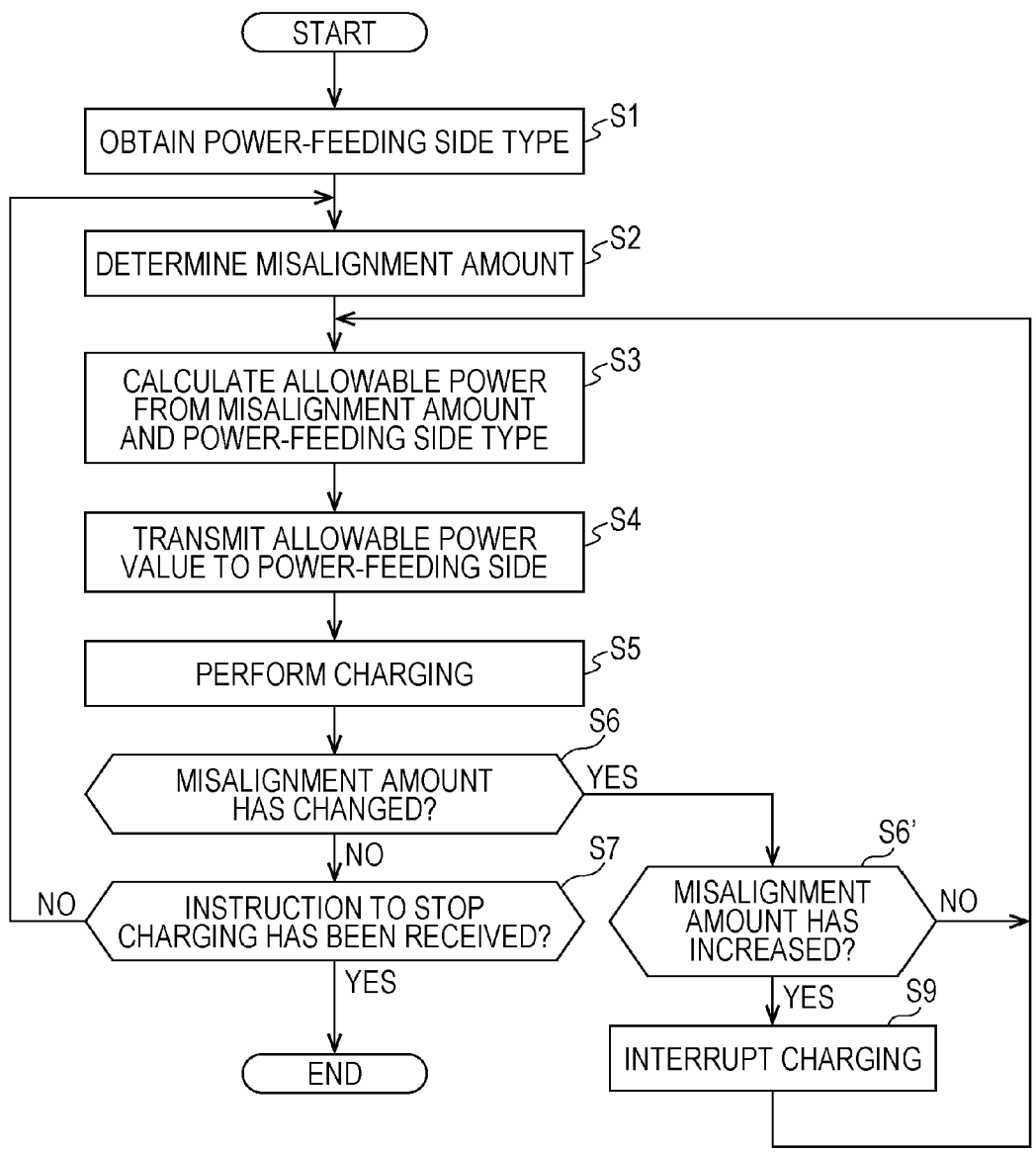
FIG. 14 is a flowchart for describing operations according to a fourth exemplary embodiment of the non-contact charging apparatus according to the embodiment.

Process Performed in the Case where Charging is Restarted after Temporary Interruption or Continued in Accordance with Change when Relative Distance (Misalignment Amount) R has Changed In a fourth exemplary embodiment for which the flowchart in FIG. 14 is referred to, after charging is started, that is, in a process in which the relative distance (misalignment amount) is determined and which is performed in step S6 after the process has performed steps S1 to S6 (NO), step S7 (NO), and step S2 and its subsequent steps, in the case where a change in the relative distance (misalignment amount) R is detected (YES in step S6), whether or not the relative distance (misalignment amount) R has increased is determined in step S6'. If the relative distance (misalignment amount) R has decreased (NO in step S6'), the leakage electromagnetic field intensity has decreased. Therefore, while the charging is continued, allowable power may be calculated from the new relative distance (misalignment amount) R in step S3, and the charging may be continued. In this case, the feeding power P1 may be decreased so that the charging efficiency η(η=100×P2/P1) has the same value before and after the charging.

In calculation of the charging efficiency η, the feeding-power calculation unit 86 obtains the power-feeding current I1 and the power-feeding voltage V1 from the power-feeding current detection unit 73 and the power-feeding voltage detection unit 74 of the external controller 26 via the communication apparatuses 32 and 68, and calculates the feeding power P1. In contrast, the received-power calculation unit 85 calculates the received power P2 from the received-power current I2 and the received-power voltage V2 detected by the charging-current detection unit 83 and the received-power voltage detection unit 84. The charging-efficiency calculation unit 87 may calculate the charging efficiency η (η=100×P2/P1) from the feeding power P1 and the received power P2.

In the determination in step S6', if the relative distance (misalignment amount) R has increased, similarly to the third exemplary embodiment, the charging is immediately interrupted in step S9. Thus, similarly to the second exemplary embodiment, a state in which the leakage electromagnetic field intensity exceeds that which does not affect the outside (e.g., the intensity defined in the ICNIRP guideline) even for a momentary time period due to low position detection responsivity and low feeding-power variable responsivity of the non-contact charging system 20 can be avoided.

In this case, after a predetermined time determined, for example, on the basis of the type of the external power-feeding apparatus 14 and the non-contact charging apparatus 10 has elapsed, allowable power may be calculated again in step S3 from the relative distance (misalignment amount) R determined in step S6 and the power-feeding side type, and the charging may be restarted in steps S4 and S5.

According to the fourth exemplary embodiment, in the case where the relative position has changed between the previous detection and the detection performed this time in the process in step S6 which is performed at every predetermined time, if the relative distance (misalignment amount) R has decreased, the feeding-power changing unit 88 continues the charging without interrupting the feeding of power. If the relative distance (misalignment amount) R has increased, the feeding-power changing unit 88 interrupts the feeding of power, whereby the charging may be restarted in such a manner that the leakage electromagnetic field intensity does not affect the outside, with further certainty.

The present disclosure is not limited to the above-described embodiments. It goes without saying that various configurations may be employed on the basis of the description.

A non-contact charging apparatus according to the embodiment of the present application receives power from a power-feeding coil through a power-receiving coil in a non-contact manner and charges a battery with the power. The non-contact charging apparatus includes a relative-position detection unit and a feeding-power changing unit. The relative-position detection unit detects a relative position between the center of the power-feeding coil and the center of the power-receiving coil. The feeding-power changing unit decreases feeding power from the power-feeding coil on the basis of the detected relative position, as a deviation amount of the relative position increases.

According to the embodiment of the present application, the relative position between the power-feeding coil and the power-receiving coil is detected. As the deviation amount of the detected relative position increases, the feeding power from the power-feeding coil is decreased. Therefore, charging can be continued in such a manner that the leakage electromagnetic field intensity does not affect the outside.

In this case, the feeding-power changing unit may perform charging with the feeding power determined on the basis of the relative position detected by the relative-position detection unit before start of the charging, and further may change the feeding power on the basis of a relative position detected at every predetermined time after start of the charging.

Thus, even when the relative position changes, for example, due to loading/unloading of loads after start of charging, charging can be continued in such a manner that the leakage electromagnetic field intensity does not affect the outside.

When the relative position has changed between the previous detection and the detection performed this time, the feeding-power changing unit interrupts the feeding of power regardless of the amount of the positional change. Alternatively, in the case where the deviation amount of the relative position detected this time is larger than that detected the last time, the feeding-power changing unit interrupts the feeding of power. Thus, charging may be restarted in such a manner that the leakage electromagnetic field intensity does not affect the outside, with further certainty.

That is, the feeding-power changing unit may restart power supply on the basis of a result of the detection of the relative position performed by the relative-position detection unit after the interruption of feeding of power.

According to the embodiment of the present application, the relative position between the power-feeding coil and the power-receiving coil is detected. As the deviation amount of the detected relative position increases (as the distance between the power-feeding coil and the power-receiving coil becomes longer), the power fed from the power-feeding coil is decreased. Therefore, an effect that charging is continued in such a manner that the leakage electromagnetic field intensity does not affect the outside is achieved.

Thus, it is not necessary to take measures, such as physical restriction for prohibiting a person from getting near a leakage electromagnetic field, by surrounding a vehicle which is being charged with a fence or the like.

Obviously, numerous modifications and variations of the present invention are possible in light of the above teachings. It is therefore to be understood that within the scope of the appended claims, the invention may be practiced otherwise than as specifically described herein.

What is claimed is:

1. A non-contact charging apparatus which receives power from a power-feeding coil through a power-receiving coil in a non-contact manner and which charges a battery with the power, the non-contact charging apparatus comprising:
a relative-position detection unit that detects a relative position between the center of the power-feeding coil and the center of the power-receiving coil; and
a feeding-power changing unit that decreases feeding power from the power-feeding coil on the basis of the detected relative position, as a deviation amount of the relative position increases,
wherein the feeding-power changing unit performs charging with the feeding power determined on the basis of the relative position detected by the relative-position detection unit before a start of the charging, and further changes the feeding power on the basis of a relative position detected at every predetermined time after the start of the charging.

2. The non-contact charging apparatus according to claim 1,
wherein, when a relative position changes between the previous detection and the current detection, the feeding-power changing unit interrupts the feeding of power regardless of the amount of the positional change.

3. The non-contact charging apparatus according to claim 2,
wherein the feeding-power changing unit restarts power supply on the basis of a result of the detection of the relative position performed by the relative-position detection unit after the interruption of feeding of power.

4. The non-contact charging apparatus according to claim 1,
wherein the feeding-power changing unit interrupts the feeding of power when a deviation amount of the relative position increases between the current detection and the previous detection.

5. A non-contact charging apparatus comprising:
a power-feeding coil;
a power-receiving coil configured to receive power from the power-feeding coil in a non-contact manner to charge a battery;
a relative-position detector configured to detect a distance between a center of the power-feeding coil and a center of the power-receiving coil; and
a feeding-power changing device configured to decrease the power from the power-feeding coil to the power-receiving coil as the distance increases,
wherein the feeding-power changing device performs charging of the battery with the power determined based on the distance detected by the relative-position detector before a start of the charging, and further changes the power based on the distance detected at every predetermined time after the start of the charging.

6. The non-contact charging apparatus according to claim 5,
wherein, when the distance changes between a previous detection and a current detection, the feeding-power changing device interrupts supplying the power regardless of an amount of change of the distance.

7. The non-contact charging apparatus according to claim 6,
wherein the feeding-power changing device restarts power supply based on a result of a detection of the distance performed by the relative-position detector after an interruption of supplying the power.

8. The non-contact charging apparatus according to claim 5,
wherein the feeding-power changing device interrupts supplying the power when an amount of change of the distance increases between a current detection and a previous detection.

9. A non-contact charging apparatus comprising:
a power-feeding coil;
a power-receiving coil configured to receive power from the power-feeding coil in a non-contact manner to charge a battery;
relative-position detection means for detecting a distance between a center of the power-feeding coil and a center of the power-receiving coil; and
feeding-power changing means for decreasing the power from the power-feeding coil to the power-receiving coil as the distance increases,
wherein the feeding-power changing means performs charging with the power determined on the basis of the distance detected by the relative-position detection means before a start of the charging, and further changes the power on the basis of a distance detected at every predetermined time after the start of the charging.

10. A method for charging a battery, comprising:

supplying power from a power-feeding coil to a power-receiving coil in a non-contact manner to charge the battery;

detecting, by a relative-position detection unit, a distance between a center of the power-feeding coil and a center of the power-receiving coil; and changing, by a feeding-power changing unit, the power from the power-feeding coil to the power-receiving coil to decrease the power from the power-feeding coil to the power-receiving coil as the distance increases, wherein the changing the power is determined on the basis of the distance before a start of the charging, and further changed on the basis of the distance detected at every predetermined time after the start of the charging.

* * * * *